(12) United States Patent
Wang et al.

(10) Patent No.: US 7,684,129 B1
(45) Date of Patent: Mar. 23, 2010

(54) IMAGING LENS SYSTEM WITH HIGH RESOLUTION AND SHORT LENGTH

(75) Inventors: Kuang-Ju Wang, Taipei Hsien (TW); Chun-Hsiang Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/344,581

(22) Filed: Dec. 28, 2008

(30) Foreign Application Priority Data

Oct. 23, 2008 (CN) .................... 2008 1 0305113

(51) Int. Cl.
*G02B 9/06* (2006.01)
*G02B 13/18* (2006.01)

(52) U.S. Cl. ........................... 359/794; 359/717

(58) Field of Classification Search ................ 359/793, 359/794, 707, 717, 740
See application file for complete search history.

(56) References Cited

U.S. PATENT DOCUMENTS 7,206,144 B2 * 4/2007 Tamura .................... 359/793
7,570,436 B2 * 8/2009 Shyu et al. ................ 359/717

* cited by examiner

*Primary Examiner*—Jack Dinh
(74) *Attorney, Agent, or Firm*—Zhigang Ma (57) ABSTRACT

An imaging lens system, in order from the object side to the image side thereof, includes a first lens with positive refractive power, and a second lens with positive refractive power. The imaging lens system satisfies the following formulas: $1.2 \leq TTL/f \leq 2.0$, where image sensing element TTL is the distance along an optical axis thereof from the object-side lens surface of the first lens to an imaging plane, f is the focal length of whole the image lens system.

16 Claims, 7 Drawing Sheets

IMAGING LENS SYSTEM WITH HIGH RESOLUTION AND SHORT LENGTH

BACKGROUND

1. Technical Field

The disclosure relates to imaging lens systems and, particularly, to an imaging lens system with a high resolution and a short overall length.

2. Description of the Related Art

In order to obtain high quality images, meanwhile still offer small-sized camera modules for use in thin electronic devices, such as mobile phones, personal digital assistants (PDA), or webcams for personal computers, the modules must have an imaging lens system with high resolution but short overall length (the distance between the object-side surface of the imaging lens and the imaging plane of the camera module). Factors affecting both the resolution and the overall length of the imaging lens system, such as the number and positions of lenses employed, the power distribution of the employed lenses, and the shape of each employed lens, complicate any attempt to achieve these goals for imaging lens systems. For example, reducing the number of lenses can shorten the overall length of an imaging lens system, but the resolution will suffer and, conversely, increasing the number of lenses can increase the resolution, but also increases the overall length of the imaging lens system.

Therefore, it is desirable to provide an imaging lens system which can overcome the abovementioned problems.

DETAILED DESCRIPTION OF THE EMBODIMENTS

Figure 1:
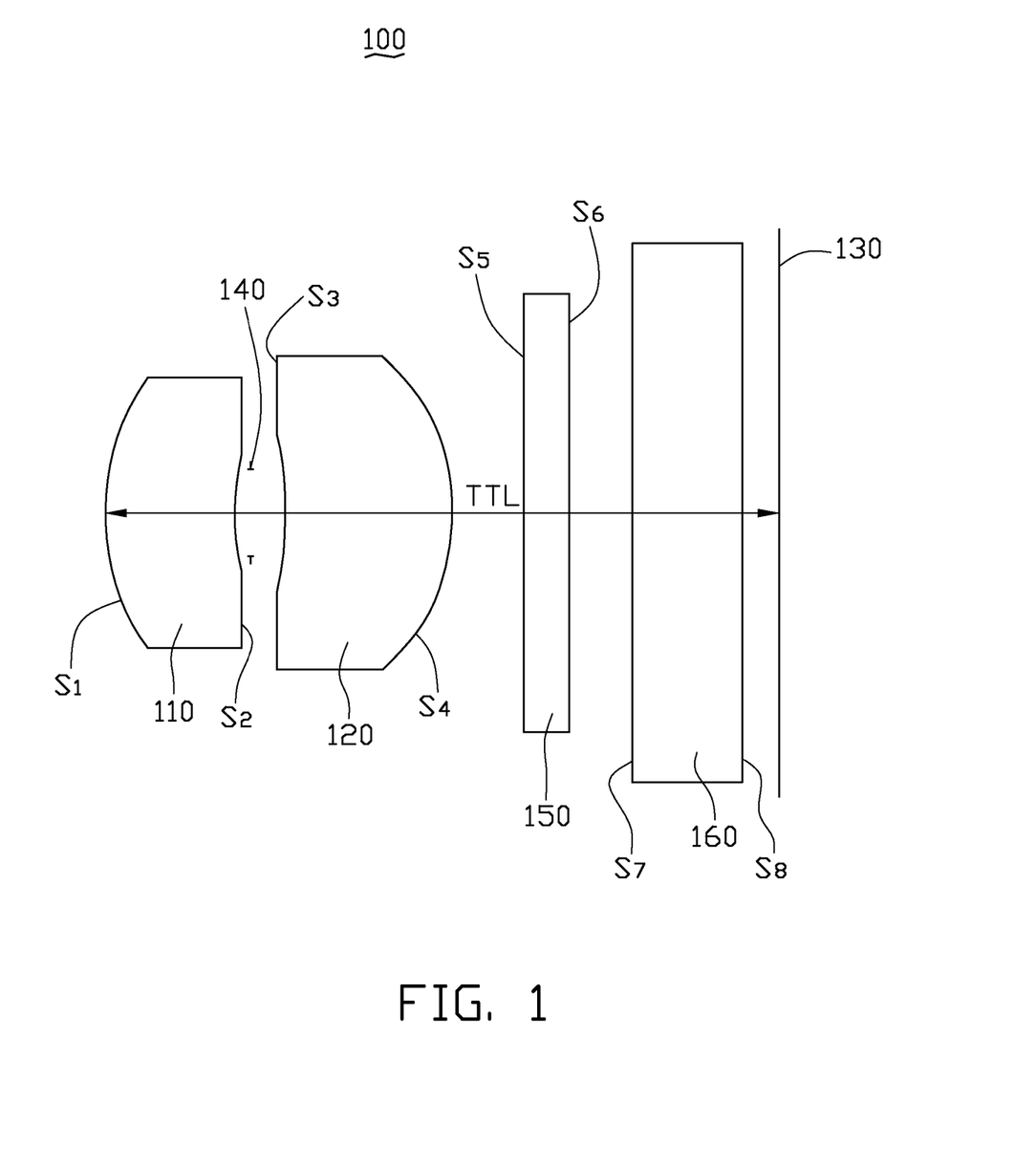
FIG. 1 is a schematic view of an imaging lens system in accordance with an embodiment.

Referring to FIG. 1, an imaging lens system 100 according to an embodiment, in order from the object side to the image side thereof, includes a first lens 110 with positive refractive power, and a second lens 120 with positive refractive power. The first lens 110 and second lens 120 each have two opposite optical surfaces in which one or both surfaces are aspherical shaped, and all optical surfaces of these lenses are referenced by symbols S1 to S4, in order from the object side to the image side of the imaging lens system 110.

Light reflected or radiated from an object enters into the imaging lens system 100, travels through the lenses 110, 120 and converges on an imaging plane 130.

In order to increase resolution and reduce the overall length of the imaging lens system 100, the imaging lens system 100 satisfies the following formulas (a): $1.2 \leq TTL/f \leq 2.0$, where TTL is the distance along the optical axis of the imaging lens system 100 from the object-side lens surface S1 of the first lens 110 to the imaging plane 130, and the letter f is the focal length of whole the image lens system 100.

Satisfying formula (a) helps minimizing the overall length of the imaging lens system 100 to obtain the shortest desirable overall length of the imaging lens system 100.

Also, along with satisfying formula (a), the imaging lens system 100 can satisfy the following formula (b): $1.5 \leq -f1/f \leq 3.0$, where the symbol f1 is focal length of the first lens 110.

Satisfying formula (b) obtains a proper proportion of the optical power of the first lens 110 to the whole of the imaging lens system 100 to reduce spherical and comatic aberration of the imaging lens system 100 as well as to simplify the manufacturing of the imaging lens system 100.

Along with satisfying formulas (a) and/or (b), the imaging lens system 100 may also satisfy the following formula (c): $0.08 \leq D2/f \leq 0.25$, where the symbol D2 is the distance between the optical surface S2 of the first lens 110 and the optical surface S3 of the second lens 120 along the optical axis of the imaging lens system 100.

Satisfying formula (c) limits the distance from the optical surface S2 of the first lens 110 to the optical surface S3 of the second lens 120 for effectively reducing the de-centering tolerance and increasing the manufacturing accuracy of the imaging lens system 100.

Furthermore, along with the formula (a), or (a) to (c), the imaging lens system 100 also satisfies the following formula (d): $60 \leq 2\omega$, where the symbol $2\omega$ is the view field angle of the imaging lens system 100. Satisfying formula (d) ensures the imaging lens system 100 has wider field of view.

In addition, along with the formula (a), or a combination of (a) to (d), the imaging lens system 100 also satisfies the following formula (e): $1.6 \leq -N1$, where the symbol N1 is the refractive index of the first lens 110 with respect to the d light (wavelength: 587.6 nm). Satisfying formula (e) enhances the refractive ability of the first lens 110 to get an even wider field of view for the imaging lens system 100.

Moreover, along with the formula (a), or a combination of (a) to (e), the imaging lens system 100 may also satisfy the following formula (f): $1.6 \leq N2$, where the symbol N2 is the refractive index of the second lens 120 with respect to the d light (wavelength: 587.6 nm). Satisfying formula (f) enhances the refractive ability of the second lens 120 to yet further increase the field of view of the imaging lens system 100.

In this embodiment, the first and second lenses 110, 120 are made of vitreous material to eliminate aberrations in and enhance the performance of the imaging lens system 100. In addition, the first and second vitreous lenses 110, 120 can withstand extreme temperatures.

The imaging lens system 100 may further include an aperture stop 140, a infrared filter 150, and a glass cover 160. The aperture 140 is positioned between the first lens 110 and the second lens 120. Both the infrared filter 150 and the glass cover 160 are positioned between the second lens 120 and the imaging plane 130. The infrared filter 150 and the glass cover 160 each has two opposite surfaces, and all surfaces of filter and cover are referenced by symbols S5 to S8, in order from the object-side to the image-side of the imaging lens system 110.

Detailed examples of the imaging lens system 100 are given below with references to the accompanying drawings FIGS. 2-7, but it should be noted that the imaging lens system 100 is not limited to these examples. Listed below are the symbols used in the detailed examples:

$2\omega$: view field angle;
R: radius of curvature;
D: distance between two adjacent lens surfaces along the optical axis of the imaging lens system 100;

Nd: refractive index of lens with respect to the d light; and
V: Abbe constant.

Tables 1, 2 show the lens data of Example 1, where 2ω=76°

TABLE 1

| Lens surfaces | R | D | nd | Vd |
| --- | --- | --- | --- | --- |
| S1 | 0.800353 | 0.414264 | 1.85135 | 40.1 |
| S2 | 0.964198 | 0.05 | | |
| Aperture stop | infinity | 0.11 | | |
| S3 | −1.85625 | 0.508718 | 1.85135 | 40.1 |
| S4 | −0.73225 | 0.170241 | | |
| S5 | infinity | 0.145 | 1.5168 | 64.167 |
| S6 | infinity | 0.2 | | |
| S7 | infinity | 0.35 | 1.5168 | 64.167 |
| S8 | infinity | 0.094382 | | |

Table 2 lists the aspheric coefficients of the lens surfaces of the each lens.

TABLE 2

| aspheric coefficients | Lens surfaces | | | | |
| --- | --- | --- | --- | --- | --- |
| | K | A4 | A6 | A8 | A10 |
| S1 | 0.270942 | 0.065045 | 0.985983 | −0.62622 | 2.738321 |
| S2 | 9.329752 | 0.01464 | −17.6215 | −8.8352 | −877.896 |
| S3 | 10.0096 | −0.76205 | 3.337396 | −38.6229 | −169.091 |
| S4 | 0.510135 | 0.271836 | −1.15815 | 3.819456 | −2.71156 |

The aspherical surface is shaped according to the formula:

$$z = \frac{ch^2}{1+\sqrt{1-(k+1)c^2h^2}} + Ah^4 + Bh^6 + Ch^8 + Dh^{10},$$

where h is a height from the optical axis of the imaging lens system 100 to the aspherical surface, c is a vertex curvature, k is a conic constant, and Ai are i-th order correction coefficients of the aspheric surfaces. In the table 2, the symbols A4 to A8 indicate the 4th to 8th order Aspherical Coefficients of the optical surfaces S1 to S4.

Figure 2:
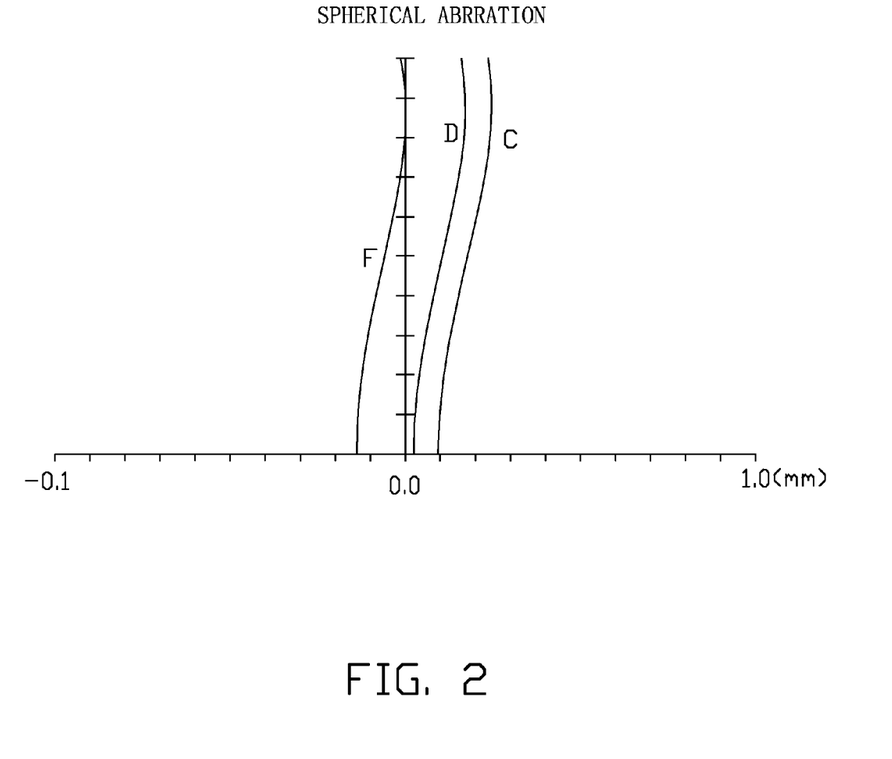
FIGS. 2-4 are graphs respectively showing spherical aberration, field curvature, and distortion occurring in the imaging lens system in accordance with a first exemplary embodiment.
Figure 3:
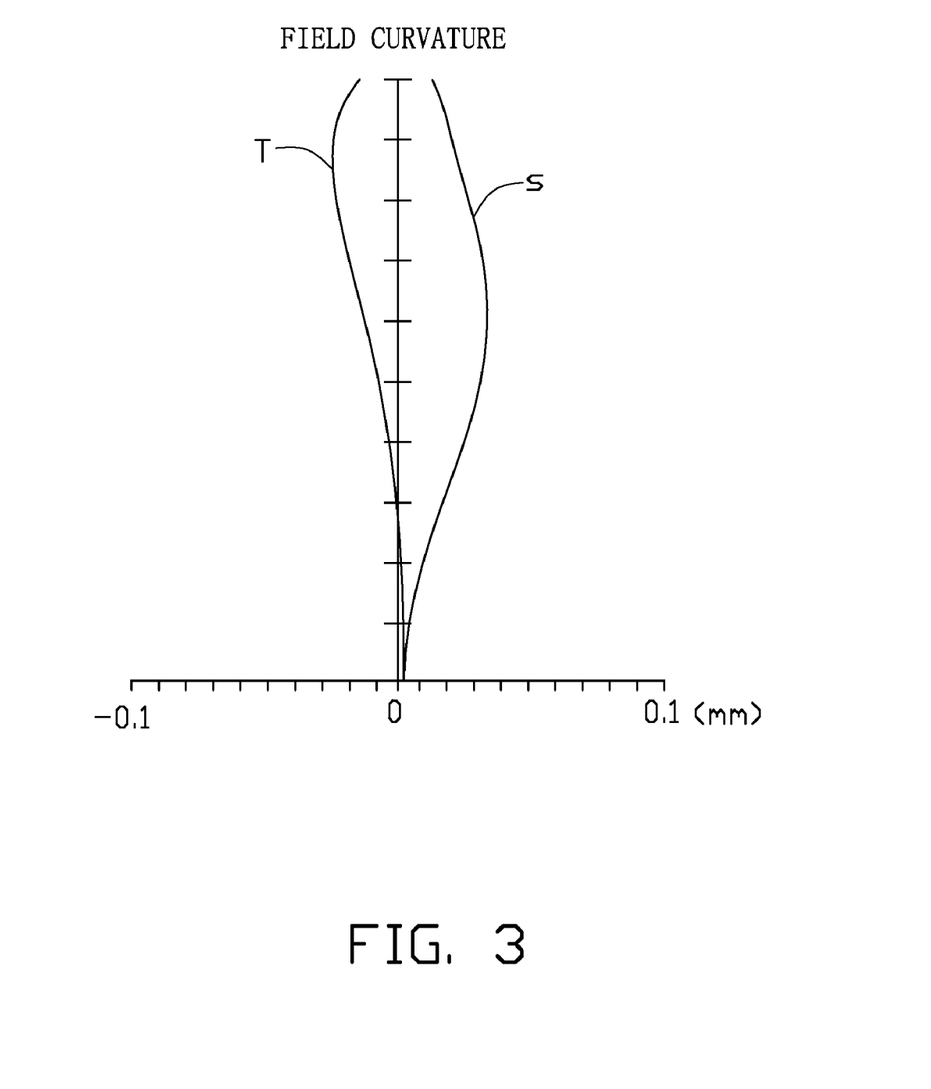
Figure 4:
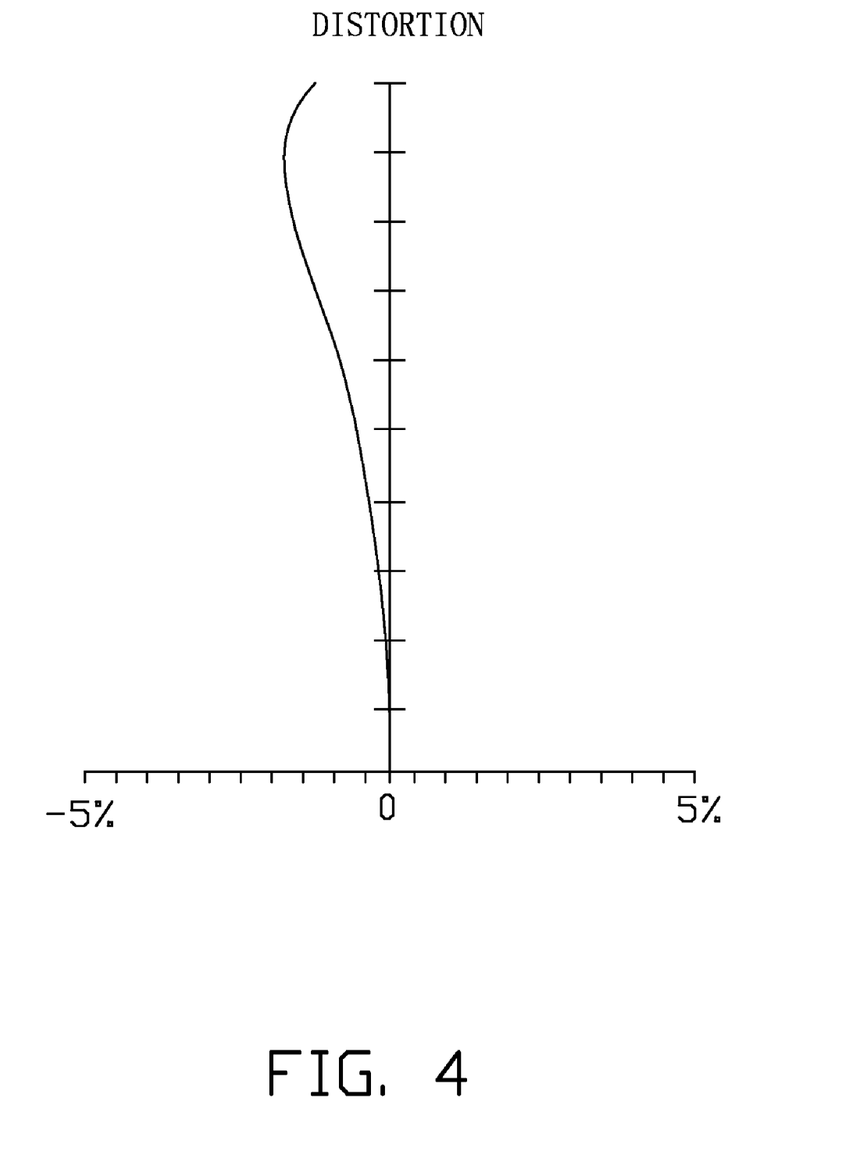

As illustrated in FIG. 2, the curves respectively indicate the spherical aberration characteristic curves of f light (wavelength: 486.1 nm), d light (587.6 nm), and c light (656.3 nm) when f, d and c light are respectively applied on the imaging lens system 100 with the coefficients listed in Example 1. Spherical aberration occurring in the imaging lens system 100 of Example 1 approximately ranges from −0.05 mm to 0.05 mm. In FIG. 3, the curves t and s represent tangential field curvature and sagittal field curvature respectively. Clearly, field curvature occurring in the imaging lens system 100 of Example 1 approximately ranges from −0.05 mm to 0.05 mm. In FIG. 4, distortion occurring in the imaging lens system 100 of Example 1 is limited to a range from −5% to 5%.

EXAMPLE 2

Tables 3, 4 show the lens data of Example 2, where the 2ω=111°.

TABLE 3

| Lens surfaces | R | D | nd | Vd |
| --- | --- | --- | --- | --- |
| S1 | 0.819813 | 0.410095 | 1.827057 | 26.269 |
| S2 | 0.933148 | 0.05 | | |
| Aperture stop | infinity | 0.11 | | |
| S3 | −1.56529 | 0.533022 | 1.851 | 40 |
| S4 | −0.68326 | 0.225621 | | |
| S5 | infinity | 0.145 | 1.5168 | 64.167 |
| S6 | infinity | 0.2 | | |
| S7 | infinity | 0.35 | 1.5168 | 64.167 |
| S8 | infinity | 0.116263 | | |

Table 2 lists the aspheric coefficients of the lens surfaces of the each lens.

TABLE 4

| aspheric coefficients | Lens surfaces | | | | |
| --- | --- | --- | --- | --- | --- |
| | K | A4 | A6 | A8 | A10 |
| S1 | 0.360608 | 0.099603 | −0.01443 | −0.69044 | 0.231616 |
| S2 | 10.01056 | 1.067597 | −21.8833 | 2.372992 | −0.95332 |
| S3 | 8.078278 | −1.32915 | −10.2717 | −43.0489 | 3.239206 |
| S4 | 0.322344 | 5.434044 | −1715.59 | −118.83 | −2.56826 |

Figure 5:
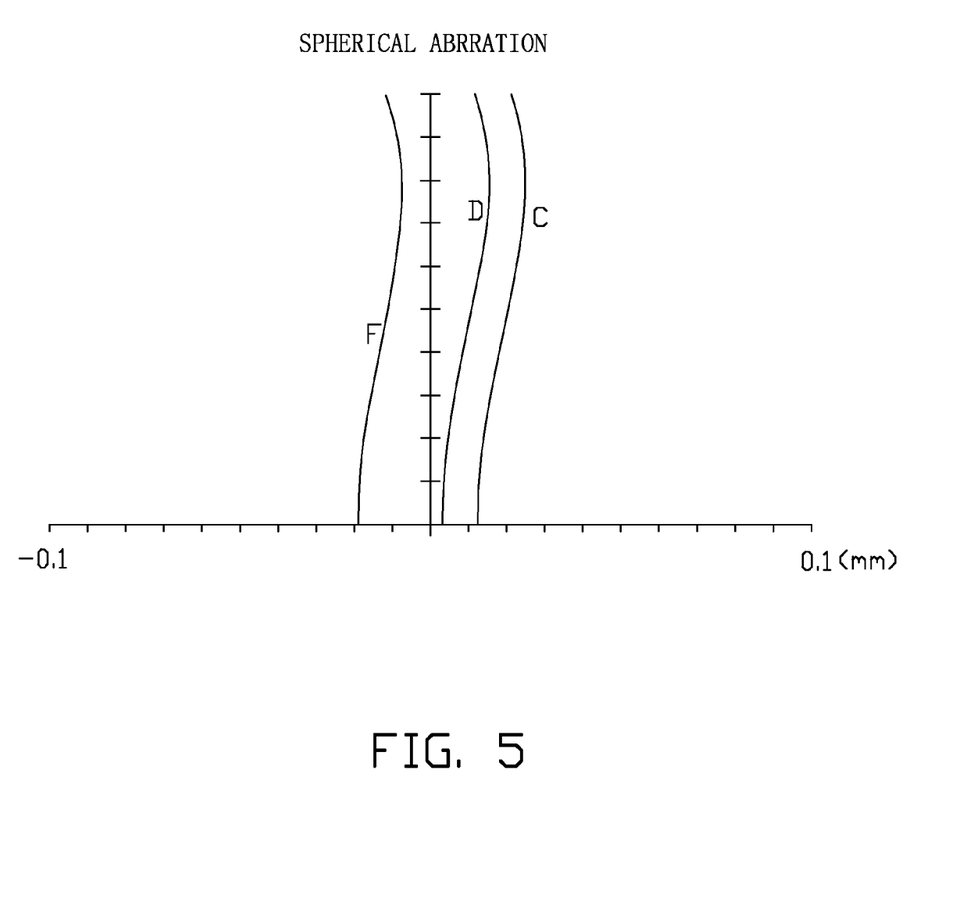
FIGS. 5-7 are graphs respectively showing spherical aberration, field curvature, and distortion occurring in the imaging lens system in accordance with a second exemplary embodiment.
Figure 6:
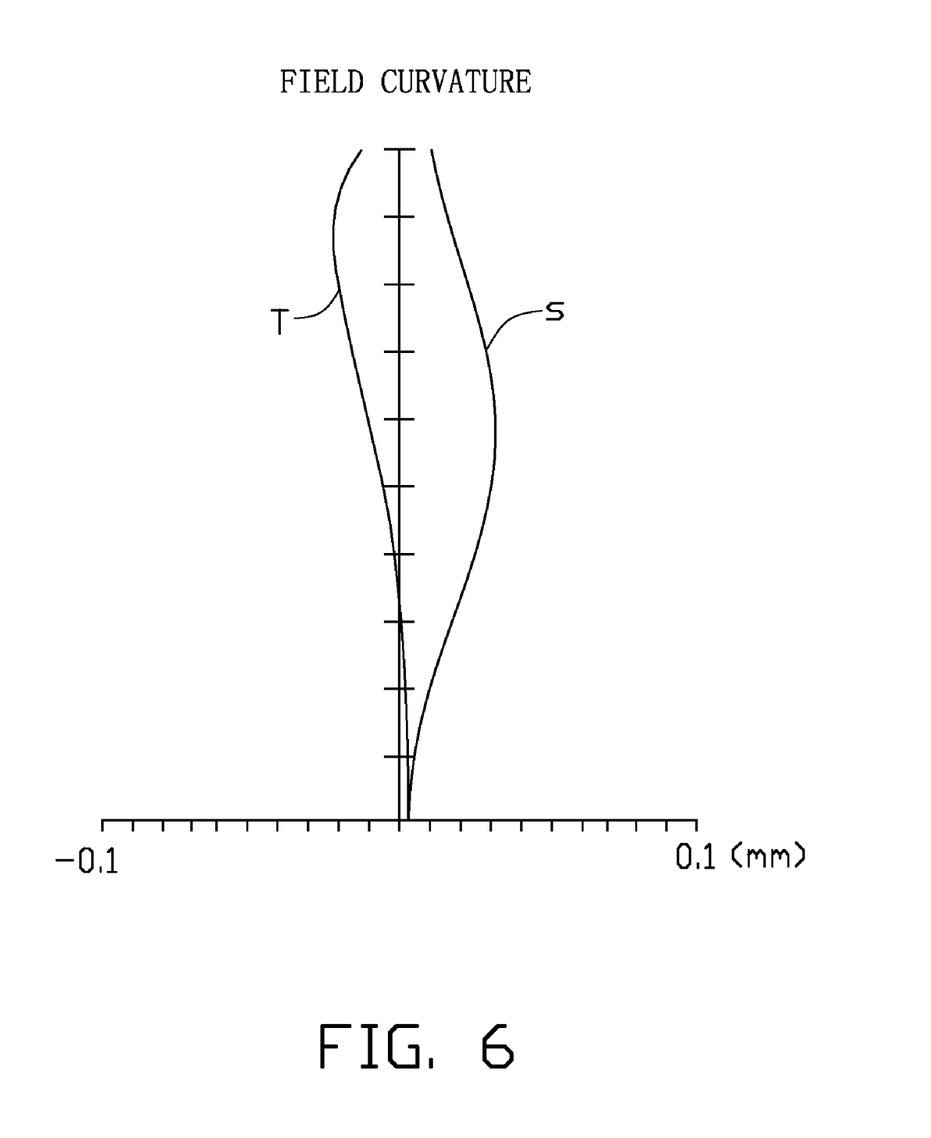
Figure 7:
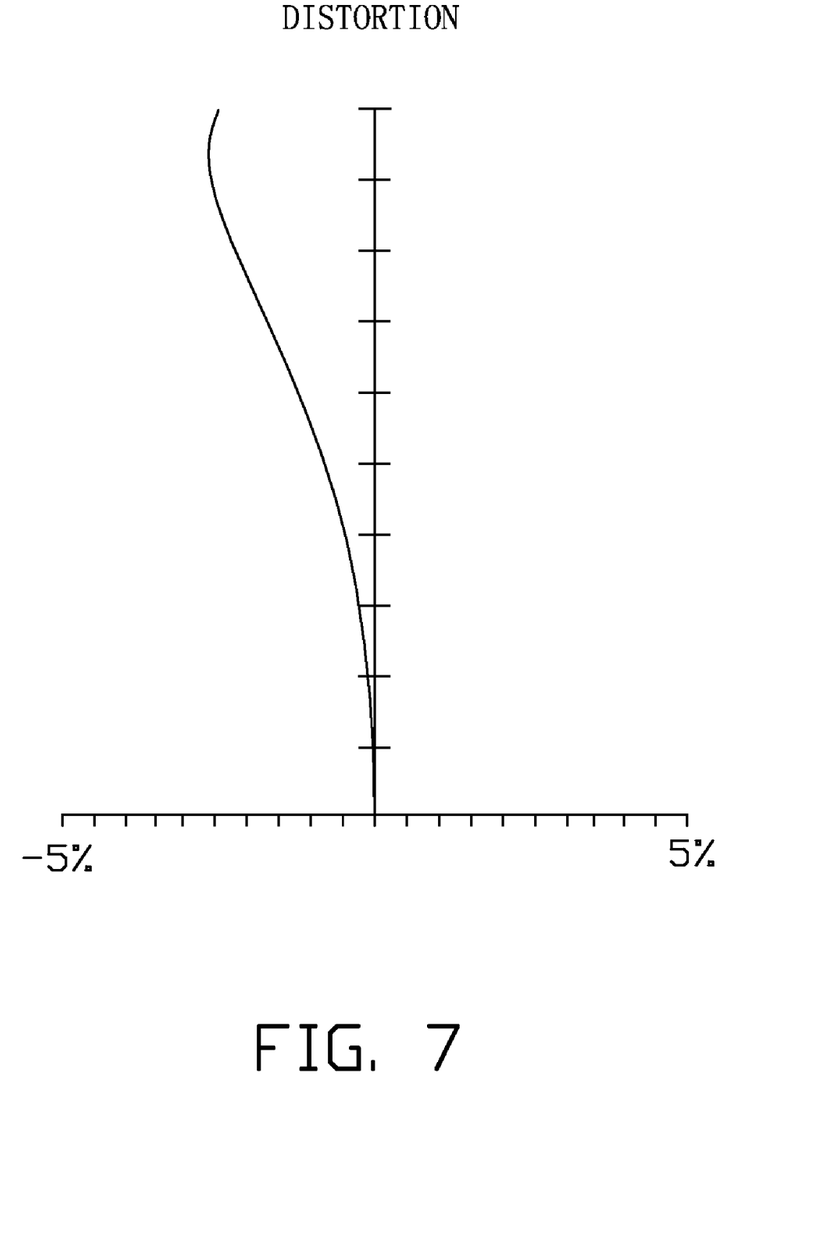

As illustrated in FIG. 5, spherical aberration occurring in imaging lens 100 of Example 2 approximately ranges from −0.05 mm to 0.05 mm. In FIG. 6, the field curvature occurring in the imaging lens 100 of Example 2 is limited to a range from −0.05 mm to 0.05 mm. In FIG. 7, distortion occurring in the imaging lens 100 of Example 2 is limited to a range from −5% to 5%.

Referring to the Examples 1, 2, although the overall length of the imaging lens 100 has been reduced, the resolution of the imaging lens system 100 is maintained and improved since aberration is held to be within an acceptable range.

The imaging lens system 100 is employed in an device having a housing and a imaging plane mounted in the housing for completing the image-capturing function.

It will be understood that the above particular embodiments are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. An imaging lens system, in order from the object side to the image side, comprising a first lens with positive refractive power, a second lens with positive refractive power, an infrared filter and a glass cover, the imaging lens system satisfying the following formulas: 1.2≦TTL/f≦2.0, where image TTL is the distance along an optical axis of the imaging lens system from the object-side lens surface of the first lens to an imaging plane, f is the focal length of the whole image lens system; the infrared filter and the glass cover satisfying the following parameters:

| Lens surfaces | D | Nd | Vd |
| --- | --- | --- | --- |
| S5 | 0.145 | 1.5168 | 64.167 |
| S6 | 0.2 | | |
| S7 | 0.35 | 1.5168 | 64.167 |

D: distance between two adjacent lens surfaces along the optical axis of the imaging lens system;
Nd: refractive index of lens with respect to the d light; and
Vd: Abbe constant;
S5: object surface of the infrared filter;
S6: image surface of the infrared filter;
S7: object surface of the glass cover.

2. The imaging lens system as claimed in claim 1, wherein the imaging lens system further satisfies the following formula: $1.5 \leq f1/f = 3.0$, where f1 is the focal length of the first lens.

3. The imaging lens system as claimed in claim 2, wherein the imaging lens system further satisfies the following formula: $0.08 \leq D2/f \leq 0.25$, where the symbol D2 is the distance between the image-side surface of the first lens and the object-side surface of the second lens along the optical axis of the imaging lens system.

4. The imaging lens system as claimed in claim 3, wherein the imaging lens system further satisfies the following formula: $60 \leq 2\omega$, where the symbol $2\omega$ is the field angle of view of the imaging lens system.

5. The imaging lens system as claimed in claim 4, wherein the imaging lens system further satisfies the following formula: $1.6 \leq N1$, where the symbol N1 is the refractive index of the first lens.

6. The imaging lens system as claimed in claim 5, wherein the imaging lens system further comprises an aperture stop, and the aperture stop is positioned between the first lens and the second lens.

7. The imaging lens system as claimed in claim 6, wherein the first lens and second lens are made of vitreous material.

8. The imaging lens system as claimed in claim 6, wherein the first lens and second lens each have one or both aspherical optical surfaces.

9. The imaging lens system as claimed in claim 1, wherein the imaging lens system further satisfies the following formula: $0.08 \leq D2/f \leq 0.25$, where the symbol D2 is the distance between the image-side surface of the first lens and the object-side surface of the second lens along the optical axis of the imaging lens system.

10. The imaging lens system as claimed in claim 1, wherein the imaging lens system further satisfies the following formula: $60 \leq 2\omega$, where the symbol $2\omega$ is the field angle of view of the imaging lens system.

11. The imaging lens system as claimed in claim 1, wherein the imaging lens system further satisfies the following formula: $1.6 \leq N1$, where the symbol N1 is the refractive index of the first lens.

12. The imaging lens system as claimed in claim 1, wherein the imaging lens system further comprises an aperture stop, and the aperture stop is positioned between the first lens and the second lens.

13. The imaging lens system as claimed in claim 1, wherein the first lens and second lens are made of vitreous material.

14. The imaging lens system as claimed in claim 1, wherein the first lens and second lens each have at least one aspherical optical surface.

15. A device with image-capturing function, comprising:
a housing;
an imaging plane mounted in the housing;
a lens system mounted in the housing an configured for forming an image on the imaging plane, the lens system comprising, in order from the object side to the image side;
a first lens with positive refractive power; and
a second lens with positive refractive power,
an infrared filter; and
a glass cover;
wherein the imaging lens system satisfying the following formulas: $1.2 \leq TTL/f \leq 2.0$, where image TTL is the distance along an optical axis of the imaging lens system from the object-side lens surface of the first lens to an imaging plane, f is the focal length of the whole image lens system;
the infrared filter and the glass cover satisfying the following parameters:

| Lens surfaces | D | Nd | Vd |
| --- | --- | --- | --- |
| S5 | 0.145 | 1.5168 | 64.167 |
| S6 | 0.2 | | |
| S7 | 0.35 | 1.5168 | 64.167 |

D: distance between two adjacent lens surfaces along the optical axis of the imaging lens system;
Nd: refractive index of lens with respect to the d light; and
Vd: Abbe constant;
S5: object surface of the infrared filter;
S6: image surface of the infrared filter;
S7: object surface of the glass cover.

16. The imaging lens system as claimed in claim 15, wherein the first lens and second lens each have one or both aspherical optical surfaces.

* * * * *